(12) United States Patent
Stahl, Jr. et al.

(10) Patent No.: US 10,695,599 B2
(45) Date of Patent: Jun. 30, 2020

(54) BUS DUCT FIRESTOP SYSTEM

(71) Applicant: Specified Technologies Inc., Somerville, NJ (US)

(72) Inventors: James P. Stahl, Jr., Princeton, NJ (US); Julio Lopes, Dunellen, NJ (US); Paul Gandolfo, Doylestown, PA (US); William Seeley, Ewing, NJ (US)

(73) Assignee: SPECIFIED TECHNOLOGIES INC., Somerville, NJ (US)

( * ) Notice: Subject to any disclaimer, the term of this patent is extended or adjusted under 35 U.S.C. 154(b) by 0 days.

(21) Appl. No.: 16/302,946

(22) PCT Filed: May 19, 2017

(86) PCT No.: PCT/US2017/033552
§ 371 (c)(1),
(2) Date: Nov. 19, 2018

(87) PCT Pub. No.: WO2017/201412
PCT Pub. Date: Nov. 23, 2017

(65) Prior Publication Data
US 2019/0290947 A1 Sep. 26, 2019

Related U.S. Application Data

(60) Provisional application No. 62/339,214, filed on May 20, 2016.

(51) Int. Cl.
*H02G 3/04* (2006.01)
*A62C 3/16* (2006.01)
(Continued)

(52) U.S. Cl.
CPC ............... *A62C 3/10* (2013.01); *A62C 2/065* (2013.01); *A62C 3/16* (2013.01); *H02G 3/0412* (2013.01); *B63B 3/48* (2013.01); *B63B 3/56* (2013.01)

(58) Field of Classification Search
CPC .. A62C 3/10; A62C 2/065; A62C 3/16; B63B 3/56; B63B 3/48; H02G 3/0412
(Continued)

(56) References Cited

U.S. PATENT DOCUMENTS

| 4,086,736 A | 5/1978 | Landrigan |
| 4,758,003 A | 7/1988 | Goldstein et al. |

(Continued)

FOREIGN PATENT DOCUMENTS

DE 102006001644 A1 7/2007

OTHER PUBLICATIONS

International Search Report and Written Opinion dated Jul. 17, 2017 for PCT/US2017/033552.
(Continued)

*Primary Examiner* — Brent W Herring
(74) *Attorney, Agent, or Firm* — Fox Rothschild LLP; Robert J. Sacco

(57) ABSTRACT

A firestop system for fire stopping a bus duct that passes through an opening in a marine deck or a marine bulkhead includes a boot seal wrapped around the bus duct housing. The boot seal has a top end attached to the bus duct, and a bottom end attached to the division. The boot seal is made of flexible material to allow for movement of the bus duct relative to the division due to vibration. The boot seal may be made of a thermal barrier wrap or other high-temperature insulating mat materials to allow heat generated under normal condition to escape while providing firestopping and temperature resistance under fire exposure conditions. The firestop system may also have a gasket positioned between the bus duct and the boot seal to accommodate irregularities in the outside surface of the bus duct housing.

18 Claims, 10 Drawing Sheets

(51) Int. Cl.
    *A62C 3/10*     (2006.01)
    *A62C 2/06*     (2006.01)
    *B63B 3/48*     (2006.01)
    *B63B 3/56*     (2006.01)

(58) Field of Classification Search
    USPC .................................. 52/1, 220.8, 232, 317
    See application file for complete search history.

(56) References Cited

U.S. PATENT DOCUMENTS

| | | | |
|---|---|---|---|
| 5,103,609 A | 4/1992 | Thoreson et al. | |
| 5,155,957 A * | 10/1992 | Robertson | A62C 2/065 |
| | | | 137/360 |
| 5,390,465 A * | 2/1995 | Rajecki | A62C 2/065 |
| | | | 285/211 |
| 5,548,934 A | 8/1996 | Israelson | |
| 5,664,810 A * | 9/1997 | Zielinski | A62C 3/16 |
| | | | 285/136.1 |
| 5,941,535 A * | 8/1999 | Richard | E03F 5/02 |
| | | | 277/604 |
| 6,173,997 B1 | 1/2001 | Nordstrom et al. | |
| 6,305,133 B1 * | 10/2001 | Cornwall | F16L 5/04 |
| | | | 52/1 |
| 6,336,297 B1 * | 1/2002 | Cornwall | F16L 5/04 |
| | | | 277/615 |
| 6,405,502 B1 * | 6/2002 | Cornwall | F16L 5/04 |
| | | | 285/42 |
| 6,470,635 B2 * | 10/2002 | Cornwall | F16L 5/04 |
| | | | 52/220.8 |
| 7,676,991 B2 * | 3/2010 | Truss | F16L 5/04 |
| | | | 137/75 |
| 7,723,622 B2 * | 5/2010 | Dukes | H02G 3/22 |
| | | | 16/2.2 |
| 8,001,737 B1 * | 8/2011 | Price | F16L 5/10 |
| | | | 248/346.5 |
| 8,024,900 B2 * | 9/2011 | Cordts | F16L 5/04 |
| | | | 52/220.8 |
| 8,146,305 B2 * | 4/2012 | Cordts | F16L 5/04 |
| | | | 52/220.8 |
| 8,191,647 B2 * | 6/2012 | Cordell | A62C 3/004 |
| | | | 169/17 |
| 8,196,359 B1 * | 6/2012 | Jiang | F03D 13/22 |
| | | | 52/173.1 |
| 8,397,438 B2 * | 3/2013 | Hoy | E04D 13/1476 |
| | | | 285/43 |
| 8,833,014 B2 * | 9/2014 | Beele | H02G 3/22 |
| | | | 277/607 |
| 8,833,478 B2 * | 9/2014 | Zernach | A62C 2/065 |
| | | | 169/48 |
| 9,220,932 B2 * | 12/2015 | Zernach | A62C 2/065 |
| 2002/0032996 A1 * | 3/2002 | Cornwall | F16L 5/04 |
| | | | 52/220.8 |
| 2003/0131881 A1 | 7/2003 | Didone et al. | |
| 2006/0191216 A1 * | 8/2006 | Truss | F16L 5/04 |
| | | | 52/232 |
| 2011/0302860 A1 * | 12/2011 | Cordts | E04G 15/063 |
| | | | 52/232 |
| 2012/0012347 A1 * | 1/2012 | Zernach | A62C 2/065 |
| | | | 169/48 |
| 2012/0216791 A1 * | 8/2012 | Munzenberger | H02G 3/088 |
| | | | 126/314 |
| 2013/0000868 A1 | 1/2013 | Taagepera et al. | |
| 2014/0367127 A1 * | 12/2014 | Zernach | A62C 2/065 |
| | | | 169/48 |

OTHER PUBLICATIONS

European Search Report dated Jan. 2, 2020 in European Patent Application No. 17800239.0 filed on Dec. 19, 2018.

* cited by examiner

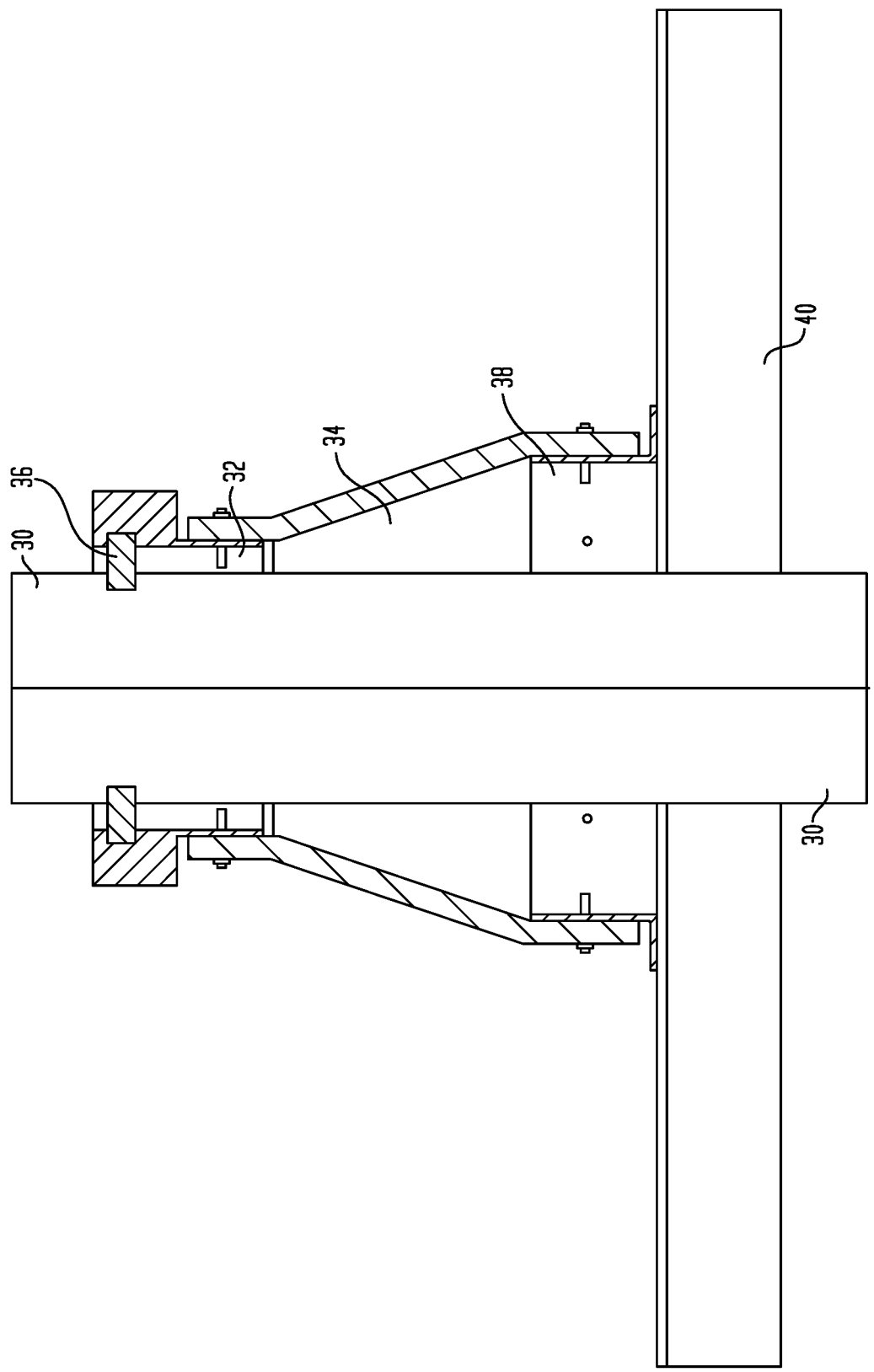

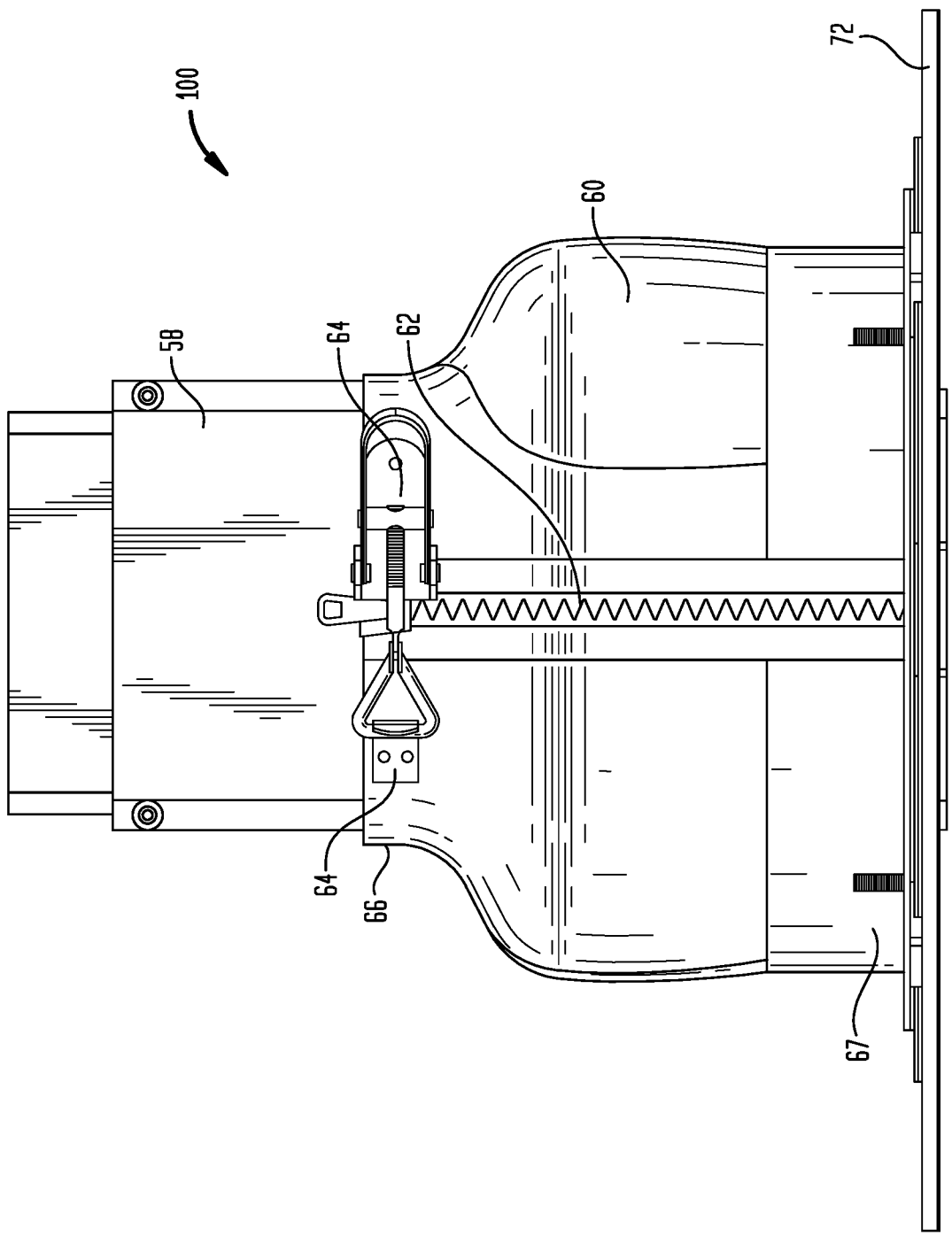

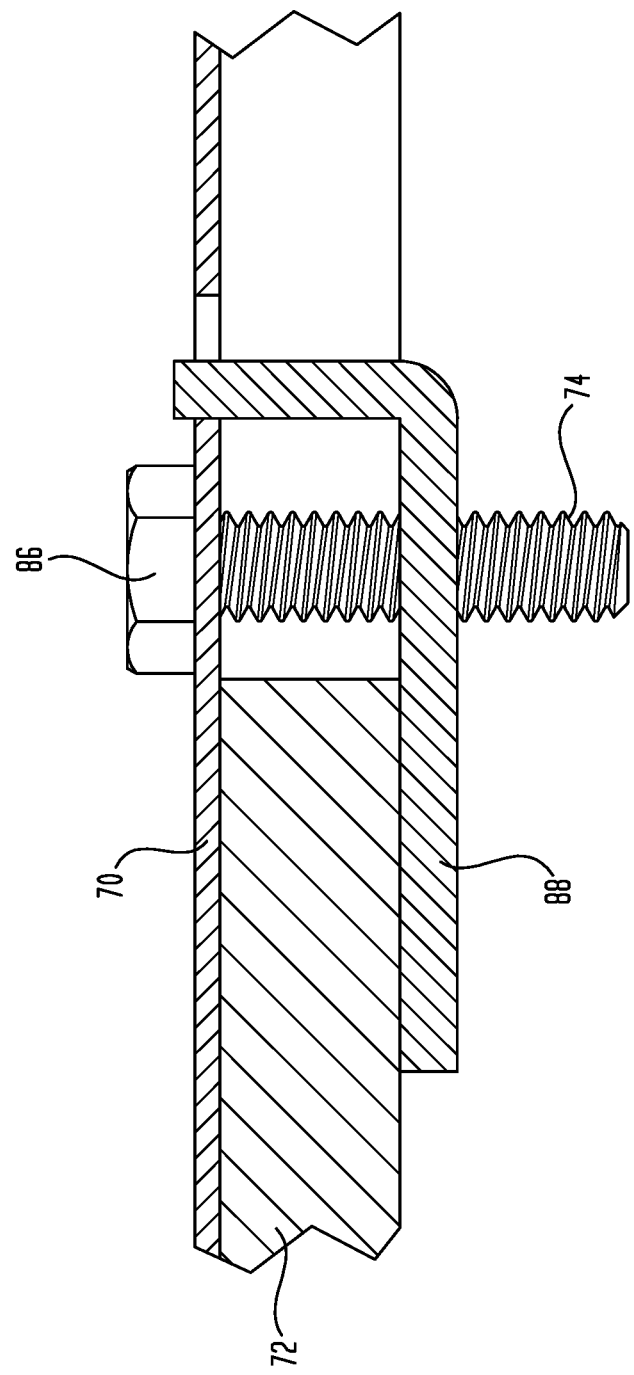

BUS DUCT FIRESTOP SYSTEM

CROSS-REFERENCE TO RELATED APPLICATIONS

This present application claims priority to International Patent Application Serial No. PCT/US2017/033552 filed on May 19, 2017, which claims priority to U.S. Provisional Patent Application No. 62/339,214 filed May 20, 2016, the disclosures of which are incorporated herein by reference in full.

FIELD OF THE INVENTION

This disclosure relates to the field of firestop system and particularly firestop system for bus duct penetrating through fire-rated divisions.

DESCRIPTION OF THE PRIOR ART

In marine construction, a bus bar enclosure, or a bus duct needs to be firestopped to comply with the International Maritime Organization (IMO) Fire Test Protocol (FTP) Code. When a bus duct penetrates through a fire-rated division, such as bulkheads and decks, many existing firestopping methods fail due to the vibration of the vessel. For example, vibrations may cause the sealant used in traditional methods to crack. Further, because the bus duct is a metal housing that is made of copper or aluminum, it tends to get hot in a fire and existing firestop products tend to trap the heat inside the bus duct.

SUMMARY

A firestop system for fire stopping a bus duct that passes through an opening in a division includes a boot seal positioned to surround the bus duct. The boot seal has a first end positioned to surround and attach to the bus duct and a second end distal from the first end and positioned to surround the bus duct and attach to the division. The division may be a marine deck or a marine bulkhead. The boot seal is made of flexible materials to allow for movement of the bus duct relative to the division due to vibration. The boot seal is also made of materials that allow for heat to escape during ambient conditions while providing firestopping and temperature resistance under fire exposure conditions. For example, the boot seal may be made of a thermal barrier wrap, such as microporous insulation material including at least alumina trihydrate. The boot seal may also be made of high-temperature fiberglass.

In some scenarios, each of the first end and second end of the boot seal defines an opening and the opening of the second end is larger than the opening of the first end. The firestop system may also include a first bracket positioned to surround the bus duct and attach the first end of the boot seal to the bus duct. The firestop system may have a gasket positioned between the first bracket and the bus duct. The gasket may be made of substantially intumescent foam gasket material.

The boot seal may include a sealable split extending from the first end of the boot seal to the second end of the boot seal to allow the boot seal to open and wrap around the bus duct for installation. In some scenarios, the sealable split may be closeable with a zipper that is made of fire retardant materials. The boot seal may also include a toggle attached thereto proximate to the first end of the boot seal to secure the boot seal to the bus duct.

The firestop system may also include a cover plate having a central opening positioned to surround a cross-section of the bus duct and configured to attach the second end of the boot seal to the division. The cover plate can be made of steel. The firestop system may also include one or more weld tabs positioned to attach the cover plate to the division. Alternatively, and/or additionally, the firestop system may have one or more clamps, each having a corresponding bolt positioned to go through an opening in the cover plate and an opening in the division and thread into the clamp so that the cover plate is attached to the division.

Additionally, the firestop system may also include one of more bolt attachments installed on the cover plate and positioned to attach a flange of the second end of the boot seal to the cover plate. The firestop system may further include a duct seal placed on the cover plate and positioned to cover the opening of the cover plate around the bus duct. The duct seal may also be locked to the cover place by one or more lock tabs that are fixedly attached to the cover plate.

In some scenarios, the firestop system may also include a second bracket positioned to attach the second end of the boot seal to the division. The second bracket may have an L-shaped cross-section formed by a first portion positioned to be attached to the division and a second portion extending perpendicularly from the first portion and positioned to attach the second end of the boot seal thereto. Alternatively, and/or additionally, the firestop system may further include a sleeve attachable to the division. The sleeve may be positioned to pass through the opening in the division. The sleeve may also have an opening that allows the bus duct to pass through. When the sleeve is attached to the division, it allows the second bracket to attach thereto, which secures the second end of the boot seal to the division.

BRIEF DESCRIPTION OF THE DRAWINGS

FIGS. 3A and 3B illustrate an example of a marine bus duct firestop system.

FIG. 6 illustrates an example of a boot seal with a sealable split in the firestop system in FIG. 5.

FIG. 7B illustrates an example of a clamp for locking the cover plate to the division.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

Figure 1:
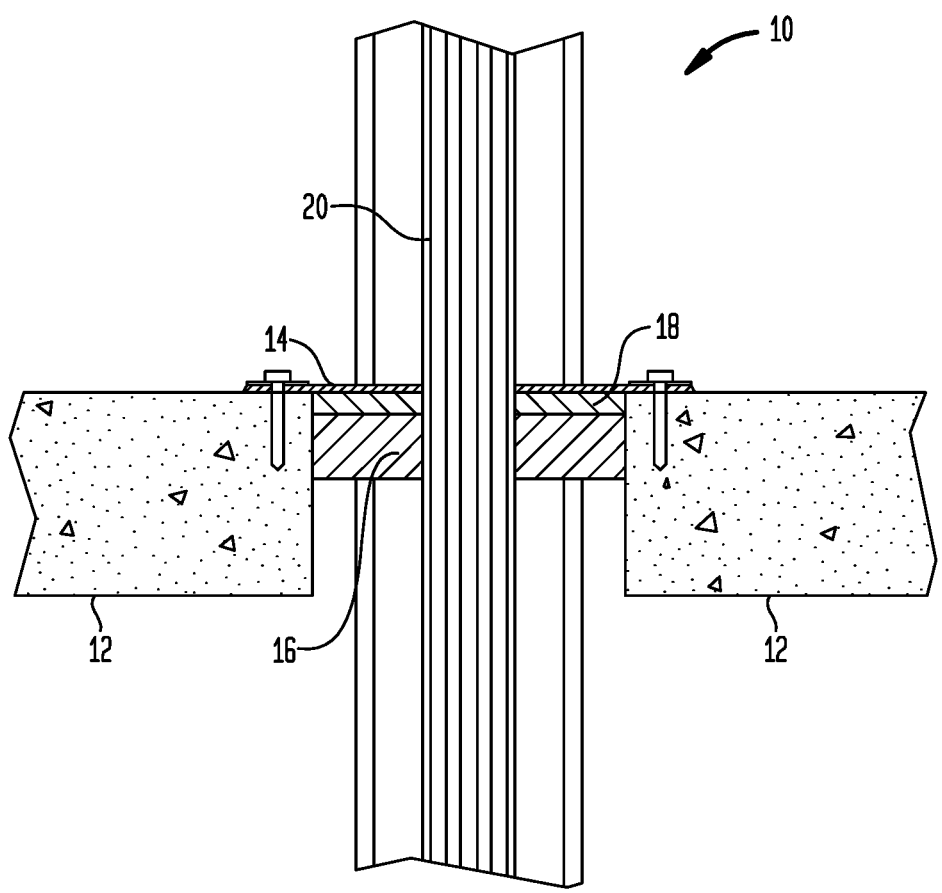
FIG. 1 illustrates a traditional bus duct firestop.

As shown in FIG. 1, a traditional bus duct firestop generally uses fire-resistant mineral wool batt insulation packing material 16 to fill in the space between the bus duct 20 and the fire-rated floor or wall 12. The fire-rated floor or wall may be a deck or bulkhead in a maritime construction. The traditional bus duct firestop system also has a firestop sealant 18 on top of the insulation material 16, and it may be covered by a steel cover plate 14. This traditional firestop system, however, may not be suitable for marine applications, in which vibration often results from the movement of the vessel. In marine applications, the sealant 18 may be prone to cracking due to the vibration. Further, the insulation material 16 is required to achieve temperature ratings, i.e. insulate the bus duct and reduce temperature transmission from exposed to unexposed side. However, as the metal housing of the bus duct gets hot as result of a fire, the insulation material can prevent the heat from being released, and thus trap the heat built up in the bus duct. When this happens, the current carrying capacity of the conductors inside the bus duct is reduced or de-rated. As such, the traditional firestop system may even create a greater fire risk or de-rating of the electrical bus bar. The bus duct firestop system described in this patent disclosure is intended to solve the above mentioned issues and/or other issues.

Figure 2:
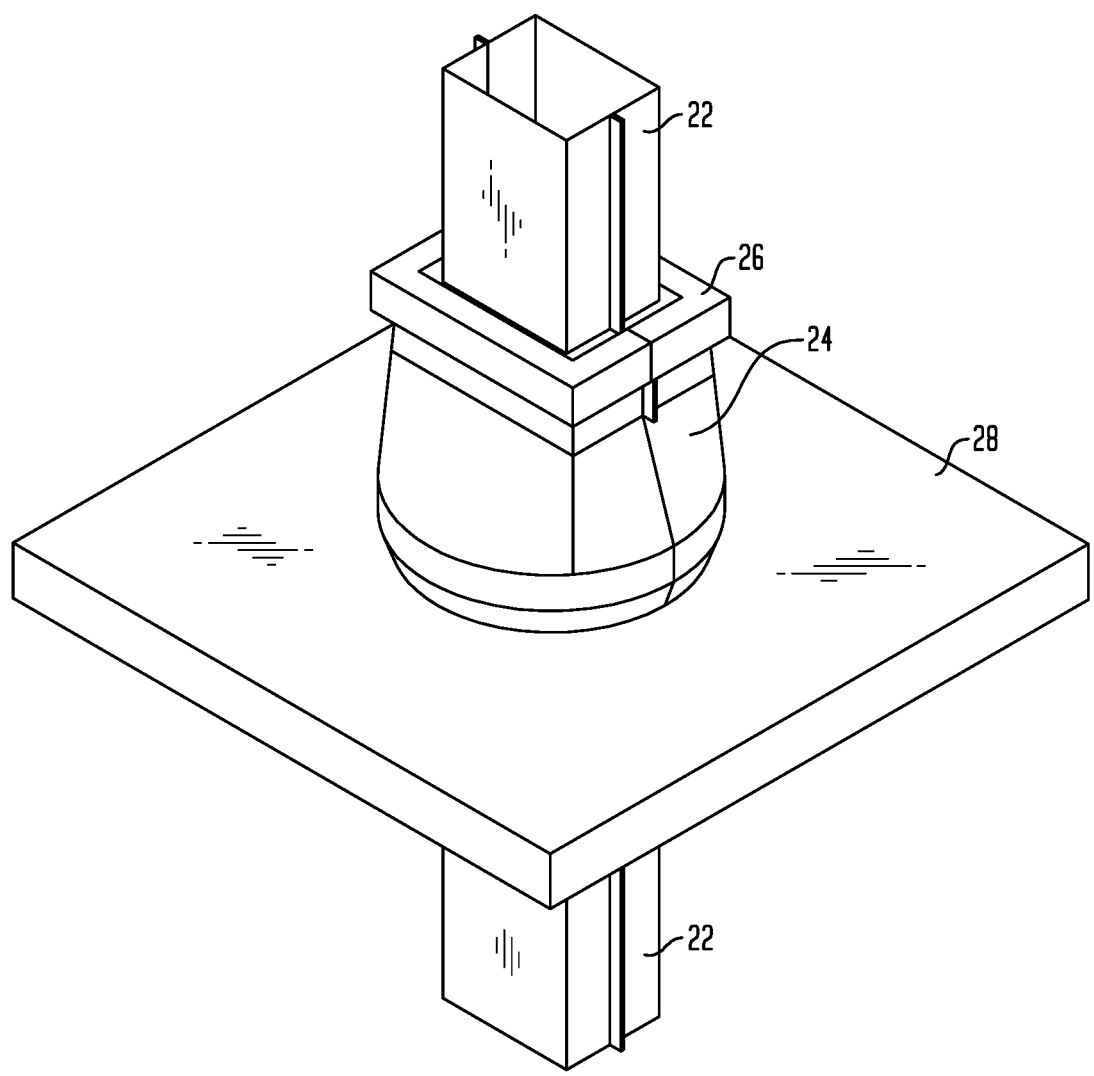
FIG. 2 illustrates an example of a marine bus duct firestop surrounding the bus duct.

As shown in FIG. 2, a firestop apparatus for fire stopping a bus duct 22 that passes through an opening in a division 28, such as a floor or wall in maritime application, includes a boot seal 24 positioned to surround the bus duct 22. The boot seal has a first (top) end positioned to surround and attach to the bus duct, and a second (bottom) end distal from the first end and positioned to surround the bus duct and attach to the division. In some scenarios, the division may be a marine deck or a marine bulkhead. Each end of the boot seal 24 has an opening to surround the bus duct, and the opening of the bottom end is larger than that of the top end.

The boot seal may be made of flexible materials to allow for movement of the bus duct relative to the division due to vibration. The boot seal may include an insulating material such as a thermal barrier wrap or a high-temperature glass fiber mat. These materials allow for heat to escape during ambient conditions while providing firestopping and temperature resistance under fire exposure conditions. The thermal barrier wrap is usually manufactured for use in large electrical panels and gas valve stations installed in fire-rated construction, and may provide up to two hours of electrical circuit integrity ensuring circuit performance even when consumed in flame. In one example, the thermal barrier wrap of the boot seal may comprise a microporous insulation material including at least alumina trihydrate. High-temperature fiberglass may be widely available in various industries, such as those made with high quality E-Glass that will not burn and will withstand continuous exposure to temperatures at about 1000° F. to 1500° F. (540° C. to 800° C.). The boot seal may also be made of silicone coated glass fabric, such as those manufactured by Alpha Associates, Inc.

Figure 3A:
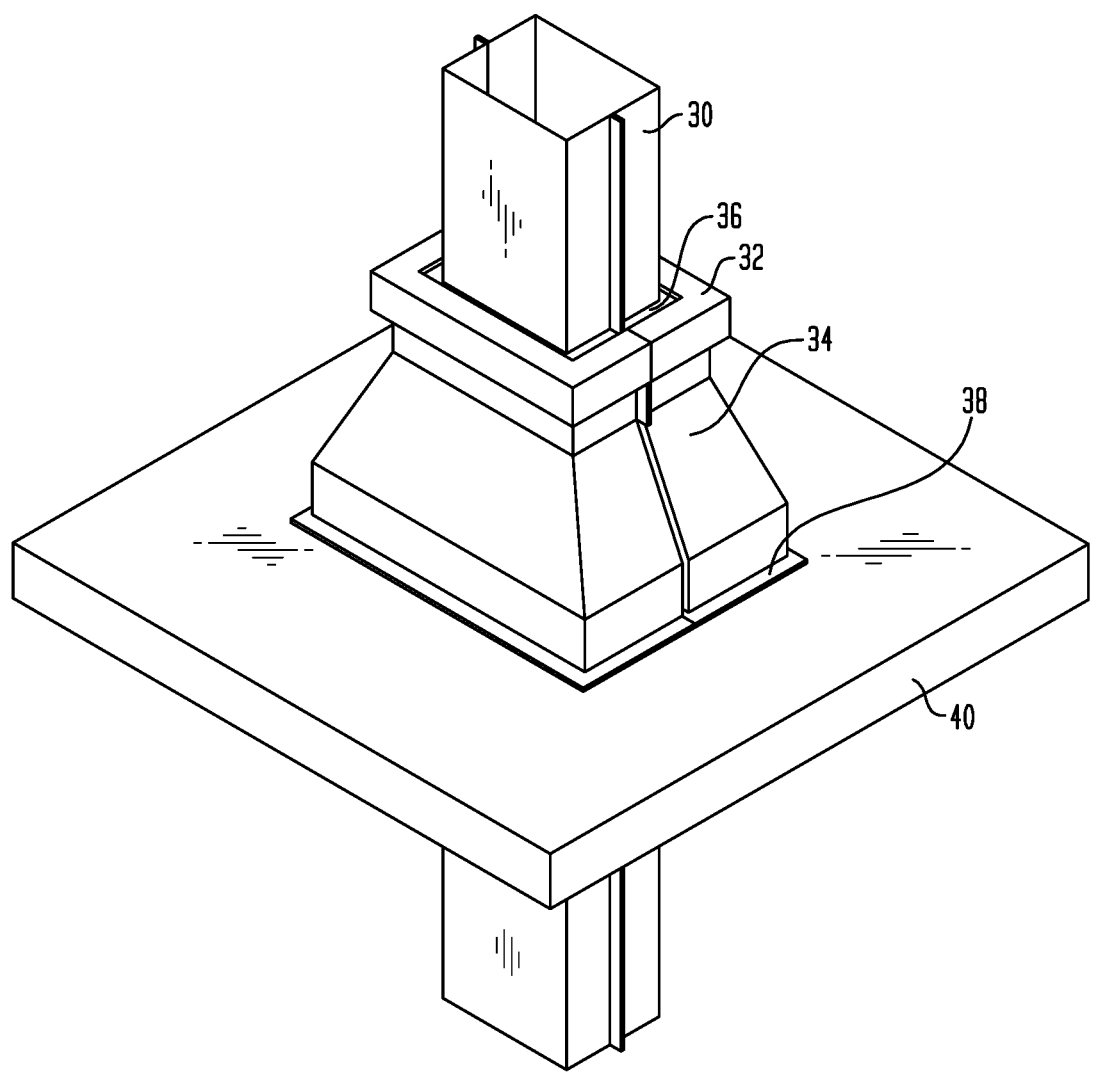

As shown in FIGS. 3A and 3B, the firestop system may include a bracket 32 positioned to surround the bus duct 30 and attach the top end of the boot seal to the bus duct. For example, the bracket 32 may be positioned between the bus duct 30 and the boot seal 34, allowing the boot seal to be fastened or screwed thereto. In some scenarios, the bracket 32 may have a shape that corresponds to the shape of the bus duct 30 to form a seal between the bus duct 30 and the bracket 32. The firestop system may also include a sealing gasket 36 positioned between the first bracket and the bus duct to conform to irregularities on the outside surface of the bus duct housing, such as seams and other projections, and perform a seal function. In some scenarios, the sealing gasket 36 may be substantially of intumescent foam material or the like.

There can be various ways to attach the bottom end of the boot seal 34 to the division 40. For example, the firestop system may also include an additional bracket 38 positioned to attach the bottom end of the boot seal 34 to the division 40. The additional bracket 38 may have a L-shaped cross-section formed by a first (horizontal) portion positioned to be attached to the division and a second (vertical) portion extending perpendicularly from the first portion and positioned to attach the second end of the boot seal thereto.

Figure 4:
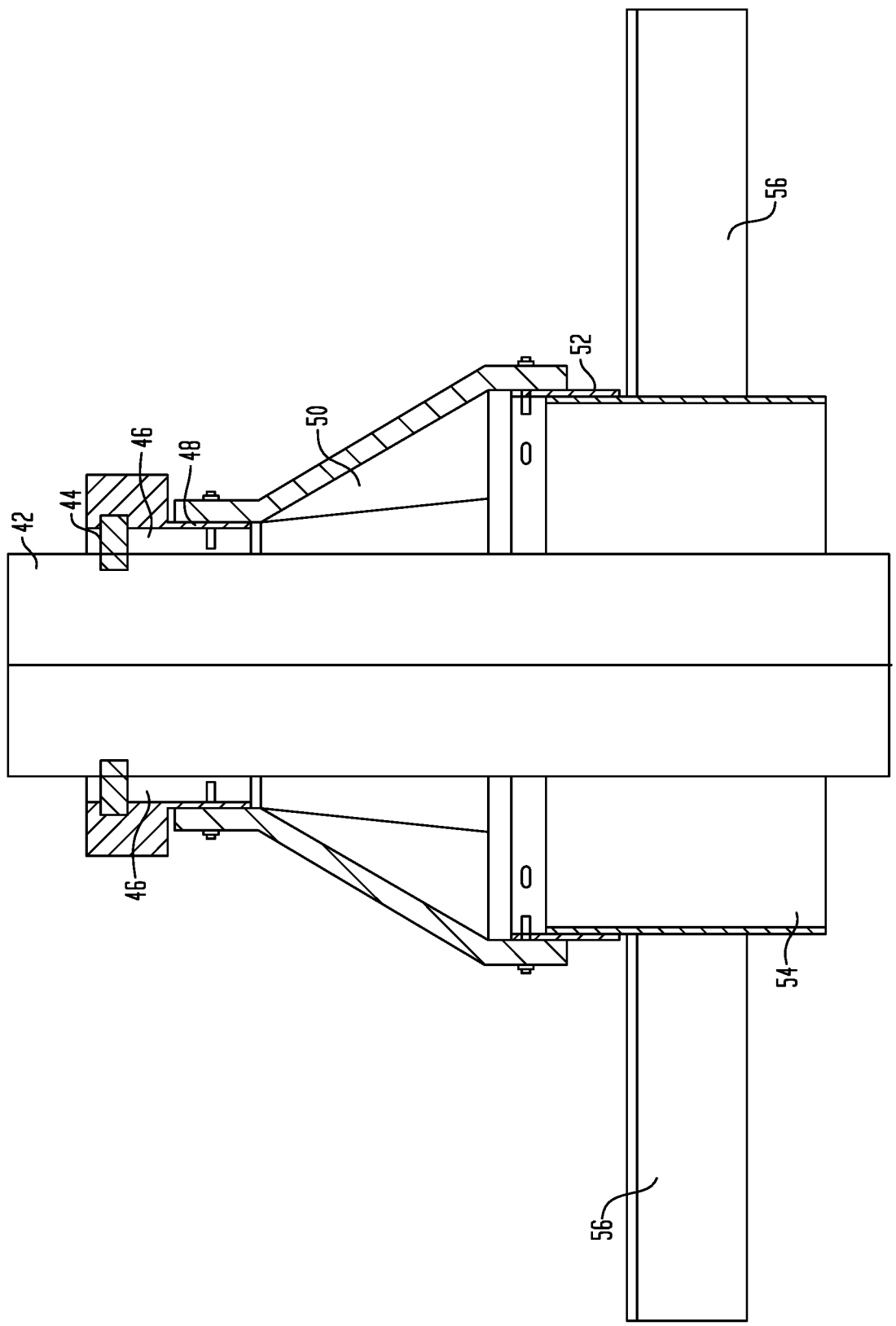
FIG. 4 illustrates an example of a marine bus duct firestop system.

As shown in FIG. 4, the firestop system may also include a sleeve 54 positioned to pass through the opening in the division, and the sleeve 54 may also have an opening that allows the bus duct 42 to pass through, where the sleeve is attachable to the division 56. For example, the sleeve can be welded, or screwed, to the bulkhead or deck. The sleeve 54 may also be configured to allow the second bracket 52 to attach thereto so that the bottom end of the boot seal 50 is secured to the division 56.

Figure 5:
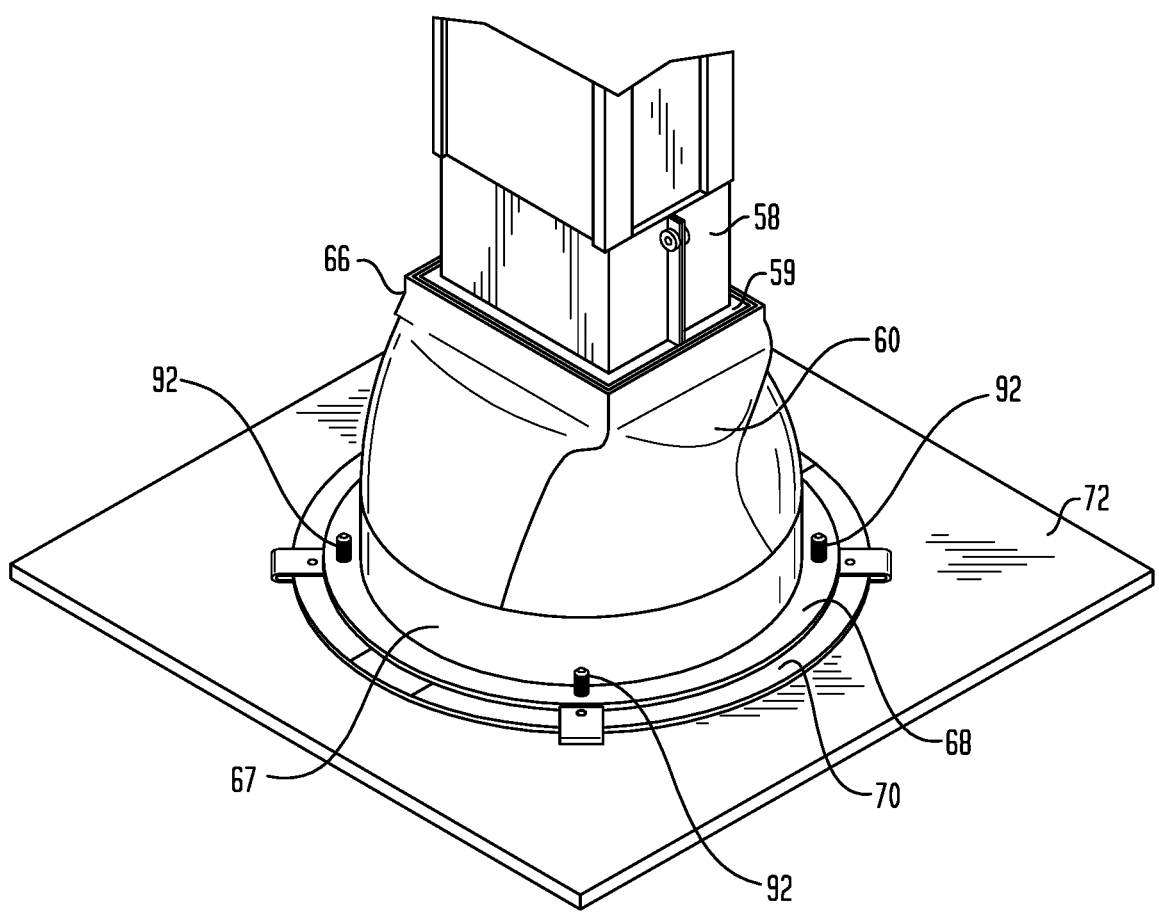
FIG. 5 illustrates an example of a marine bus duct firestop system.

The above illustrated embodiments can vary. For example, in a preferred embodiment, as shown in FIGS. 5-7, the firestop system may include a boot seal 60 positioned to surround the bus duct 58. The boot seal 58 has two ends: the top end 66 and the bottom end 67 distal from the top end 66. The top end 66 is positioned to surround and attach to the bus duct 58, whereas the bottom end 67 is positioned to surround the bus duct 58 and attach to the division 72. The boot seal 60 can be made of flexible materials such that it allows for movement of the bus duct relative to the division due to vibration. In a marine construction, the division may be a marine deck or a marine bulkhead. The materials for the boot seal 60 can use the various embodiments illustrated above.

In FIG. 6, the boot seal 60 may include a sealable split 62 extending from the top end 66 of the boot seal 60 to the bottom end 67 of the boot seal 60 to allow the boot seal 60 to open and wrap around the bus duct 58 for installation. In some scenarios, the sealable split 62 may be a zipper made of fire retardant materials. The boot seal 60 may further include a toggle 64 attached thereto proximate to the top end 66 of the boot seal 60. The boot seal 60 may be opened at the sealable split 62, wrapped around the bus duct 58, and sealed at the sealable split 62. Then the toggle 64 may be engaged to tighten the top end of the boot seal 60 so that it is secured around the bus duct 58. The attachment of the boot seal 60 to the division 72 will be further explained with reference to FIGS. 7A-7C.

Figure 7A:
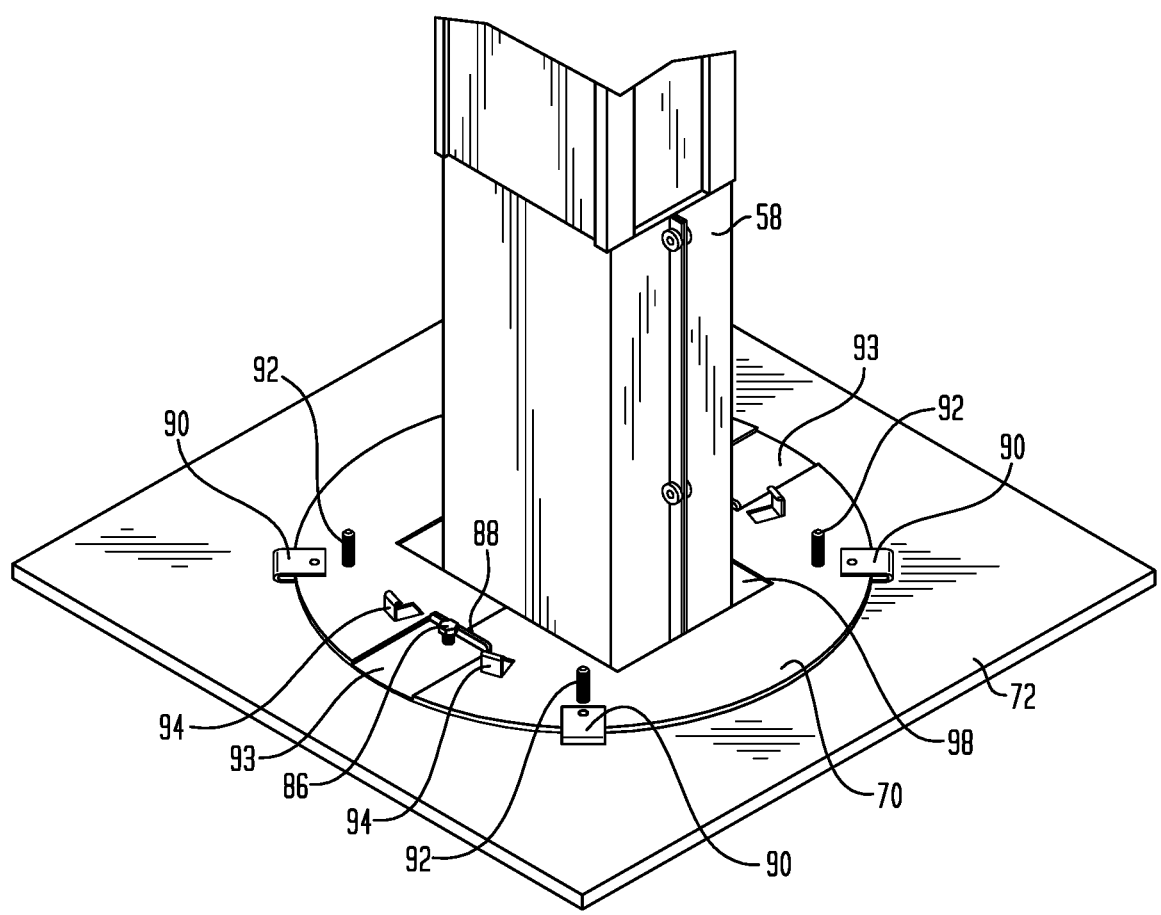
FIG. 7A illustrates an example of a cover plate of the firestop system in FIG. 5.

In FIG. 7A, the firestop system may include a cover plate 70, which has a central opening 98 positioned to surround a cross-section of the bus duct 58. The cover plate 70 can be made of metal, such as steel, and it can be configured to attach the bottom end of the boot seal to the division, which will be explained further. The firestop system may further include one or more weld tabs 90 positioned to attach the cover plate 70 to the division 72. In some scenarios, the weld tabs 90 may be welded to the division, and allow for the cover plate 70 to attach thereon. In other scenarios, the welded tabs 90 may be glued, screwed or attached using other means to the division 72. The illustrated attachment of the cover plate 70 to the division 72 provides the benefits of vibration resistant and elimination the need for other attachments.

In order to be installed around the bus duct 58, the cover plate 70 may be split into multiple sections that join together. For example, the cover plate 70 may include two halves, which will be installed separately and joined together surrounding the bus duct 58. In some scenarios, the cover plate 70 may include one or more bolt attachments 92, such as one or more bolts, to attach the bottom end of the boot seal to the cover plate 70. In doing so, as shown in FIG. 5, the bottom end 67 of the boot seal 60 may have a base, such as a flange

68, which has one or more holes aligned with the one or more bolts 92 of the cover plate 70 to allow attachment of the boot seal 60 to the division 72 with hex nuts screwed onto the bolts 92. Other methods, such as using a bracket, as illustrated above, may also be used to attach the boot seal 60 to the division 72.

Returning to FIG. 7A, to provide sufficiently strong support for attaching the boot seal, the cover plate 70 may include multiple metal plates stacked together. For example, the cover plate 70 may include two metal plates, which provide a total thickness of about 10 mm. The cover plate 70 can be attached to the division 72 using a clamp 88. This attachment is further shown in FIG. 7B. In FIG. 7B, the cover plate 70 is attached to the division 72 using a locking bolt 74 and a clamp 88. The locking bolt has a head 86 and is threaded to mate with a thread in an opening of the clamp 74. The division 72 and the cover plate 70 are now sandwiched between the head 86 of the locking bolt 74 and the clamp 88. The locking bolt 74, when tightened, will toggle-lock the cover plate 70 to the division 72. This attachment is simple and permanent. It is also vibration resistant. It may also accommodate a wide range of deck thickness depending on the bolt length. For example, the deck thickness may be in the range from 4 mm to 16 mm or more. The thickness of the cover plate may be in the range of 10 mm.

In case a cover plate 70 has multiple plates stacked together, all of the stacked plates may be sandwiched between the head of the locking bolt 74 and the clamp 88. Alternatively, as shown in FIG. 7A, a stacked cover plate may have at least a bottom plate and a top plate. The bottom plate of the stack may be attached to the division with a clamp 88, with a top plate on top, whereas the top plate leaves an opening 93 for the head of the locking bolt 86. Similarly, the top plate may also have one or more holes aligned with the bolts 92 that are attached to the bottom plate, so that the top plate can be stacked on top of the bottom plate. When the boot seal is placed on top of the cover plate and bolted to the cover plate via the one or more bolts 92 (in FIG. 5), the top plate of the stacked cover plate will also be secured to the bottom plate and the division.

Figure 7C:
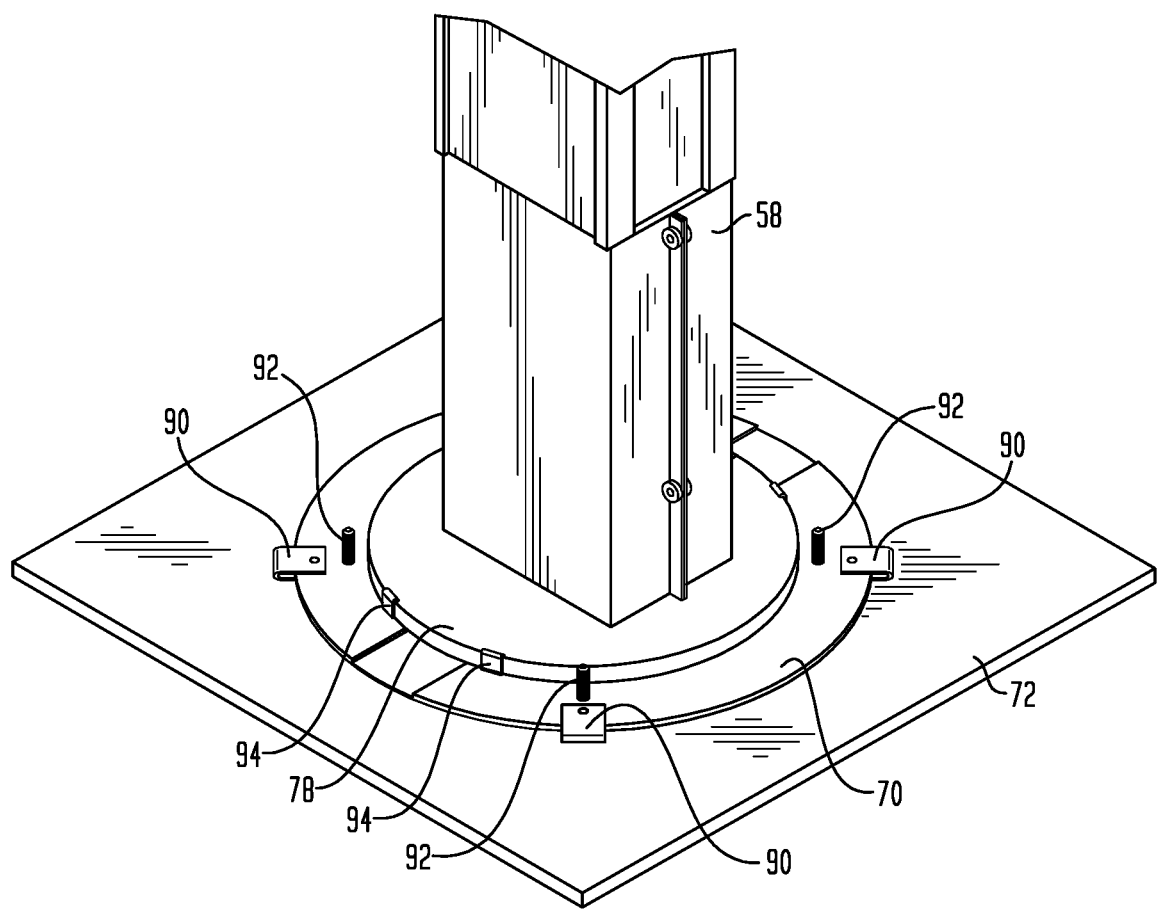
FIG. 7C illustrates an example of a duct seal in the firestop system in FIG. 5.

As shown in FIG. 7C, the firestop system may further include a duct seal 78 placed on the cover plate 70 and positioned to cover the opening (98 in FIG. 7A) of the cover plate around the bus duct. The duct seal 78 may be attached to the cover plate 70 by one or more lock tabs 94. In some scenarios, the duct seal 78 may be made of intumescent foam. In order to be installed surrounding the bus duct, the duct seal 78 may be split into multiple sections, which can be joined together. The duct seal 78, when joined together, has an opening that corresponds to the shape of the bus duct so that when installed, will form a seal around the bus duct 58.

The above illustrated various embodiments provide easy methods of installing the firestop system. For example, a method for installing the illustrated firestop system in FIGS. 5-7 may include placing a bottom cover plate 70 over an opening of the division 72 and attaching the bottom cover plate to the division 72 with one or more clamps 88. Alternatively, and/or additionally, the method may also include fixedly attaching one or more weld tabs 90 on the division 72 and attaching the bottom cover plate to the division 72 via the weld tabs 90. The bottom cover plate may have a central opening 98 of any size to accommodate the opening of the division 72, in which the bus duct 58 goes through. For example, the opening 98 of the cover plate 70 may have a diameter of 250 mm. The bottom cover plate may also be split into multiple sections that, when bolted to the division 72, join together to form around the bus duct 58. The method of installing may also include placing a top cover plate over the bottom plate. The bottom plate may have one or more bolt attachments 92, such as threaded bolts, attached thereto, where the threaded bolts pass through openings in the top cover plate.

The method of installing may also include placing a split intumescent foam duct seal 78 around the bus duct 58, pushing it down flush with top of cover plates, and engaging the foam seal onto one or more lock tabs 94, which are fixedly attached to the cover plate 70. Additionally, the method of installing may include wrapping a split boot seal 60 around the bus duct 58, where the split boot seal has a sealable split 62, such as a zipper. The method may further include engaging and closing the zipper 62 to secure the top end 66 of the boot seal 60 to the bus duct 58 housing. The method may further include engaging an optional toggle 64 attached proximate to the top end 66 of the boot seal 60 to further tightly secure the boot seal 60 to the bus duct 58. In attaching the bottom end 67 of the boot seal 60, the method may include passing the threaded bolts 92 on the cover plate 70 through openings at the bottom end 67 of the boot seal 60 (e.g. a base or a flange) and attaching the boot seal 60 to the cover plate 70 using hex nuts.

In the above illustrated embodiments, a boot seal and various other components are disclosed to provide firestopping between a bus duct and a division in which the bus duct goes through. These embodiments provide advantages in that the firestop system can withstand vibrations as result of movement of vessel in marine applications. One or more components are disclosed to attach the boot seal to the bus duct and the division. Specific materials are also disclosed for various components of the firestop system. For example, the boot seal is a thermal barrier wrap, such as microporous insulation loaded with alumina trihydrate, or high-temperature fiberglass mat, to allow for heat to escape during ambient conditions while providing firestopping and temperature resistance under fire exposure conditions. The gasket used for attaching the top end of the boot seal to the bus duct is an intumescent foam gasket to be able to accommodate irregularities of the bus duct surface and thus provide a seal between the bus duct and the top end of the boot seal. These disclosures provide the several advantages of the firestop system over traditional firestop system, particularly in marine applications. However, it should be noted that such materials are merely illustrative for achieving a desired performance in a desired application. As the application varies, other materials may be substituted.

Other advantages of the present invention can be apparent to those skilled in the art from the foregoing specification. Accordingly, it be recognized by those skilled in the art that changes or modifications may be made to the above-described embodiments without departing from the broad inventive concepts of the invention. It should therefore be understood that this invention is not limited to the particular examples and embodiments described herein, but is intended to include all changes, modifications, and all combinations of various embodiments that are within the scope and spirit of the invention as defined in the claims.

The invention claimed is:

1. A firestop apparatus for fire stopping a bus duct that passes through an opening in a division, said apparatus comprising:
    a boot seal comprising an insulating material, the boot seal having a first end and a second end distal from the first end;

the first end defining a first opening and positioned to surround the bus duct;

a first bracket positioned to surround the bus duct and attach the first end to the bus duct;

a gasket positioned between the first bracket and the bus duct;

the second end defining a second opening larger than the first opening;

the second end positioned to surround the bus duct and attach to the division;

wherein the boot seal is made of flexible material to allow for movement of the bus duct relative to the division due to vibration.

2. The apparatus of claim 1 wherein the insulating material is configured to allow heat to escape during ambient conditions while providing firestopping and temperature resistance under fire exposure conditions.

3. The apparatus of claim 2 wherein the boot seal comprises a thermal barrier wrap or a high-temperature fiberglass mat.

4. The apparatus of claim 3 wherein the thermal barrier wrap comprises a microporous insulation material including at least alumina trihydrate.

5. The apparatus of claim 1 wherein the gasket comprises a substantially intumescent foam gasket material.

6. The apparatus of claim 1 wherein the boot seal comprises a sealable split extending from the first end of the boot seal to the second end of the boot seal to allow the boot seal to open and wrap around the bus duct for installation.

7. The apparatus of claim 6 wherein the sealable split is closeable with a zipper.

8. The apparatus of claim 7 wherein the boot seal further comprises a toggle attached thereto proximate to the first end of the boot seal and configured to secure the boot seal to the bus duct.

9. The apparatus of claim 8 further comprising a cover plate having a central opening positioned to surround a cross-section of the bus duct and configured to attach the second end of the boot seal to the division.

10. The apparatus of claim 9 further comprising one or more weld tabs positioned to attach the cover plate to the division.

11. The apparatus of claim 9 further comprising one or more clamps, each having a corresponding bolt positioned to go through an opening in the cover plate and an opening in the division and thread into the clamp so that the cover plate is attached to the division.

12. The apparatus of claim 11 further comprising one of more bolt attachments installed on the cover plate and positioned to attach a flange of the second end of the boot seal to the cover plate.

13. The apparatus of claim 12 further comprising a duct seal placed on the cover plate and positioned to cover the opening of the cover plate around the bus duct.

14. The apparatus of claim 13 further comprising one or more lock tabs attached to the cover plate and positioned to lock the duct seal to the cover plate.

15. The apparatus of claim 1 further comprising a second bracket positioned to attach the second end of the boot seal to the division.

16. The apparatus of claim 15 wherein the second bracket has an L-shaped cross-section formed by a first portion positioned to be attached to the division and a second portion extending perpendicularly from the first portion and positioned to attach the second end of the boot seal thereto.

17. The apparatus of claim 15 further comprising a sleeve positioned to pass through the opening in the division and also having an opening that allows the bus duct to pass through, wherein the sleeve is attachable to the division and configured to allow the second bracket to attach thereto to allow the second end of the boot seal to be secured to the division.

18. A method for fire stopping a bus duct that passes through an opening in a division, comprising:

providing at the opening a boot seal comprising an insulating material, the boot seal having a first end and a second end distal from the first end;

arranging the boot seal so that the first end defining a first opening is positioned to surround the bus duct;

using a first bracket positioned to surround the bus duct to attach the first end of the boot seal to the bus duct;

positioning a gasket between the first bracket and the bus duct;

forming the second end of the boot seal to define a second opening larger than the first opening;

arranging the second end of the boot seal so that it surrounds the bus duct and attaching the second end to the division; and facilitating vibrational movement of the bus duct relative to the division by forming the boot seal of a flexible material.

* * * * *